United States Patent [19]

Pugliese et al.

[11] 4,174,659
[45] Nov. 20, 1979

[54] COFFEE BREWER

[75] Inventors: John P. Pugliese, Troy; Thomas J. Robbins, Warren, both of Mich.

[73] Assignee: Econo-Brew, Inc., Mt. Clemens, Mich.

[21] Appl. No.: 851,142

[22] Filed: Nov. 14, 1977

[51] Int. Cl.² .............................................. A47J 31/10
[52] U.S. Cl. ...................................................... 99/306
[58] Field of Search .................. 99/306, 304, 316, 295

[56] References Cited

U.S. PATENT DOCUMENTS

| | | | |
|---|---|---|---|
| 2,359,936 | 10/1944 | Peterson | 99/306 |
| 3,139,344 | 6/1964 | Weisman | 99/306 |
| 3,215,060 | 11/1965 | Perlov | 99/306 |

Primary Examiner—Robert W. Jenkins
Attorney, Agent, or Firm—Basile and Weintraub

[57] ABSTRACT

A coffee brewer having a cup-shaped reservoir sized to hold a quantity of water sufficient to fill a cup of desired size. The coffee brewer also includes a coffee receptacle having a size to receive a charge of ground coffee sufficient to make one cup of brewed coffee of maximum desired strength. The reservoir and receptacle are shaped to telescopically receive one another in a snug-like engagement to securely and releasably attach the reservoir to the receptacle. The reservoir is provided with a plurality of apertures which permit the flow of heated water from the reservoir into the receptacle, while the receptacle is provided with a plurality of slits that permit the flow of brewed coffee from the receptacle into the cup in time relation to the flow of heated water from the reservoir into the receptacle. The receptacle includes an integral, radially extending flange that supports the coffee brewer on the upper edges of the cup.

1 Claim, 8 Drawing Figures

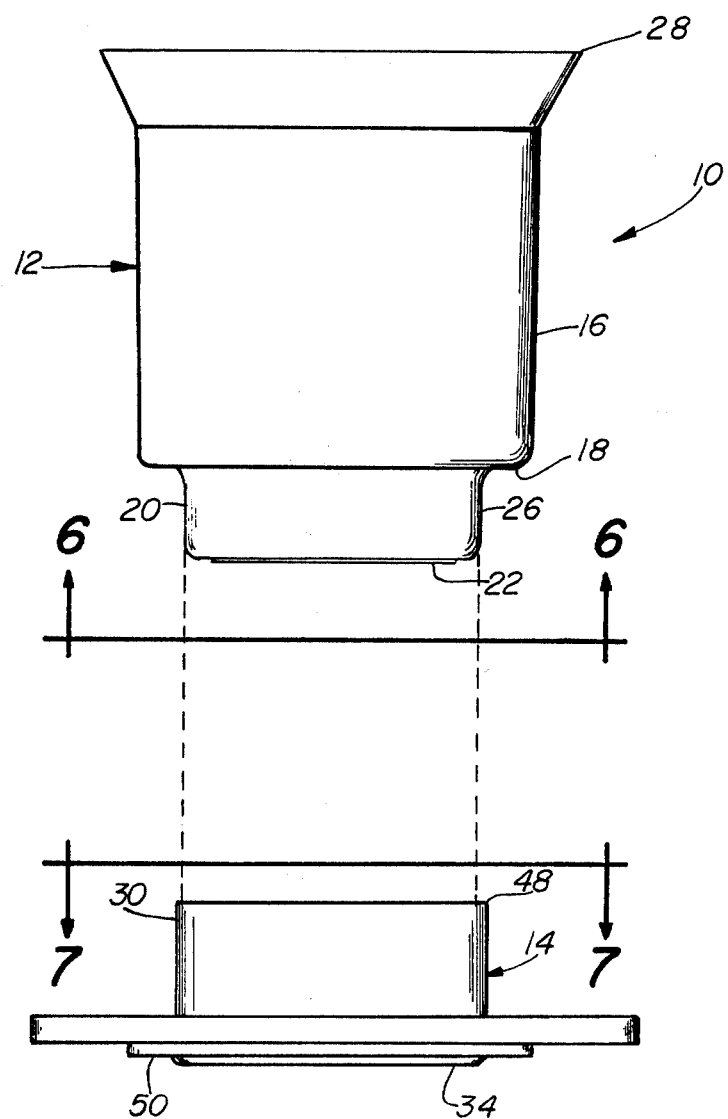
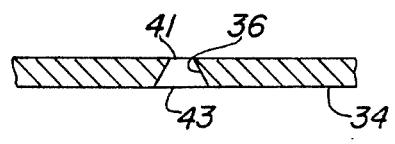

COFFEE BREWER

CROSS REFERENCE TO RELATED APPLICATIONS

The present application relates to co-pending U.S. design patent applications Ser. No. 800,333 filed May 25, 1977, and Ser. No. 818,118 filed July 22, 1977.

BACKGROUND OF THE INVENTION

I. Field of the Invention

The present invention relates to a coffee brewer and, in particular, to a one-cup coffee brewer of the drip type.

II. Description of the Prior Art

Heretofore, numerous types of drip coffee makers have been developed, many of which are particularly adapted for brewing a single cup of coffee. Examples of one-cup coffee brewers are disclosed in U.S. Pat. Nos. 3,215,060 and 1,412,388. West German Pat. No. 1,057,760 and Italian Pat. No. 598,677 disclose additional variations of one-cup coffee brewers. Of related interest are patents which deal with various apparatuses that are similar in function or employ connecting features which are relevant to applicant's invention. These include British Pat. No. 9943 and U.S. Pat. Nos. 2,567,183 and 3,118,562.

Many of the devices disclosed in the aforementioned patents have several shortcomings, including complexity of design, which result in difficult usage as well as being expensive to manufacture. They include the insertion of a charge of coffee in the cavity of the receptacle at the bottom of the water reservoir. This makes it difficult to judge the amount of coffee therein and creates numerous cleaning problems with such prior art apparatuses. One attempt to correct these problems is disclosed in U.S. Pat. No. 3,215,060. This patent discloses a one-cup coffee maker wherein a cup-shaped receptacle of a size to receive a charge of finely ground coffee is illustrated as having finely perforated bottom apertures and is adapted to fit freely upwardly into a cylindrically shaped socket provided in the lower end of a reservoir which, in turn, includes a support flange that supports the coffee maker on the cup adapted to receive the brewed coffee. While this patent represents the closest relevant prior art of which applicants are aware, it does not disclose those features which applicants have claimed as their invention.

III. Prior Art Statement

In the opinion of applicants and applicants' attorney the aforementioned patents represent the closest relevant prior art of which applicants and applicants' attorney are aware.

SUMMARY OF THE INVENTION

The present invention, which will be described subsequently in greater detail, comprises a one-cup coffee maker having a cup-shaped reservoir that is telescopically secured to a cup-shaped coffee receptacle. The cup-shaped reservoir has an upper circular wall and a lower circular wall of a lesser diameter, the walls being connected by an integral shoulder. The lower wall has a bottom that includes a plurality of orifices of a predetermined size that permit a measured amount of water to flow therethrough at a predetermined rate. The lower circular wall has an inward taper extending from the shoulder toward the bottom thereof to define a socket engaging surface that is adapted to snugly and sealingly engage a complementary shaped, tapered surface formed on the interior of the cup-shaped coffee receptacle. The coffee receptacle includes a bottom wall with a plurality of transverse slits that define apertures communicating the interior of the receptacle with the cup on which the coffee maker is supported. The interior of the coffee receptacle is sized to receive a charge of ground coffee sufficient to make a cup of brewed coffee of maximum desired strength. The receptacle has an integral, annular, support flange projecting radially from the lower end of the receptacle outer wall, and the support flange has a diameter greater than that of the maximum size of the cup on which the coffee maker is to be positioned to support both the receptacle and reservoir when the reservoir is filled with water.

It is therefore a primary object of the present invention to provide a new and improved one-cup coffee brewer of the drip type.

It is a further object of the present invention to provide a one-cup coffee maker of the type described which is of a simple design and, thus, is inexpensive to manufacture and easy to use.

Other objects, advantages and applications of the present invention will become apparent to those skilled in the art of one-cup coffee makers when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 5 is an exploded, side elevational view of the one-cup coffee maker illustrated in FIG. 1 of the drawings;

FIG. 8 is an enlarged, fragmentary view of the coffee receptacle taken along Line 8—8 of FIG. 4.

DESCRIPTION OF THE PREFERRED EMBODIMENT

Figure 1:
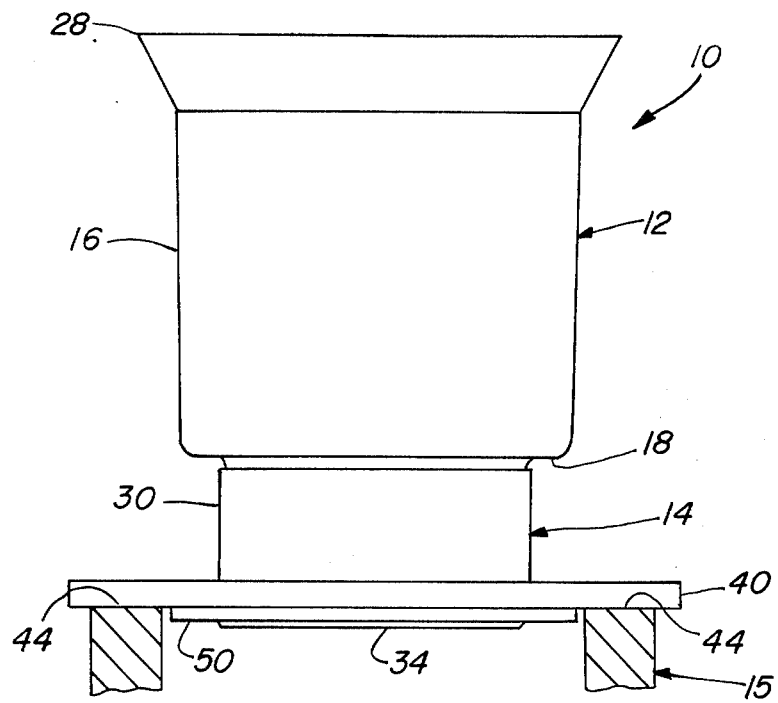
FIG. 1 is a side elevational view of a one-cup coffee maker constructed in accordance with the principles of the present invention.

Referring now to the drawings and, in particular, to FIGS. 1 through 4, there is illustrated one example of the present invention in the form of a one-cup coffee brewer 10. The coffee brewer 10 comprises a cup-shaped reservoir 12 which is telescopically received by a cup-shaped coffee receptacle 14, both of which will be described in greater detail hereinafter. The cup-shaped reservoir 12 is sized to hold a quantity of water which is sufficient to fill a coffee cup 15 (FIG. 1) of maximum designed size. At the same time, the coffee receptacle 14 is sized to receive a charge of ground coffee sufficient to make one cup of brewed coffee of maximum desired strength. As can best be seen in FIGS. 2 and 4, the cup-shaped reservoir 12 comprises an enlarged, diametered section 16 having a generally circular cross-section terminating at its lower portion in an integral shoulder 18 which, in turn, is integral with a second circular section 20 of a lesser diameter than the circular section 16. Integral with the circular section 20 is a bottom 22 that is provided with a plurality of apertures or orifices 24, which will be explained in greater detail hereinafter. Of particular interest is the outer peripheral surface 26 of the circular section 20. The peripheral surface 26 is provided with a taper, commencing from the shoulder 18 inwardly toward the bottom 22, and functions in a manner that will be described hereinafter with respect to the description of the cup-shaped coffee receptacle 14.

The upper end of the cup-shaped reservoir 12 includes an outwardly flaired section 28. The flaired section 28 provides a dual purpose in that the user of the coffee maker 10 may grasp the enlarged, cylindrical section 16 to separate it from the coffee receptacle 14, and the flaired section 28 provides a convenient abutment for the hand of the user in achieving separation. Additionally, the flaired section 28 provides an enlarged, cross-sectional area at the upper edge of the reservoir 12 to minimize the possibility of water splashing or otherwise being spilled from the reservoir 12 when hot water is initially poured into the same.

Figure 4:
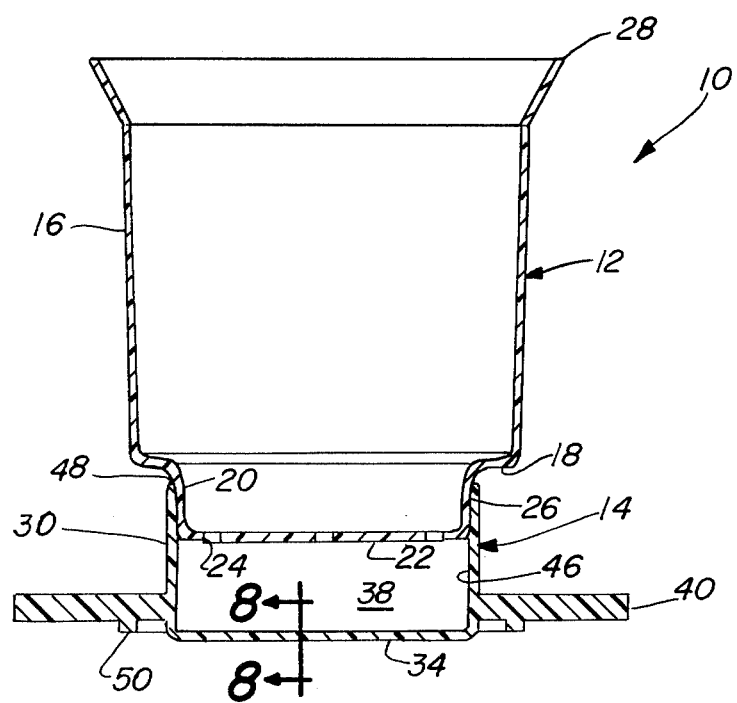
FIG. 4 is a longitudinal, cross-sectional view of the one-cup coffee maker taken along Line 4—4 of FIG. 2.
Figure 2:
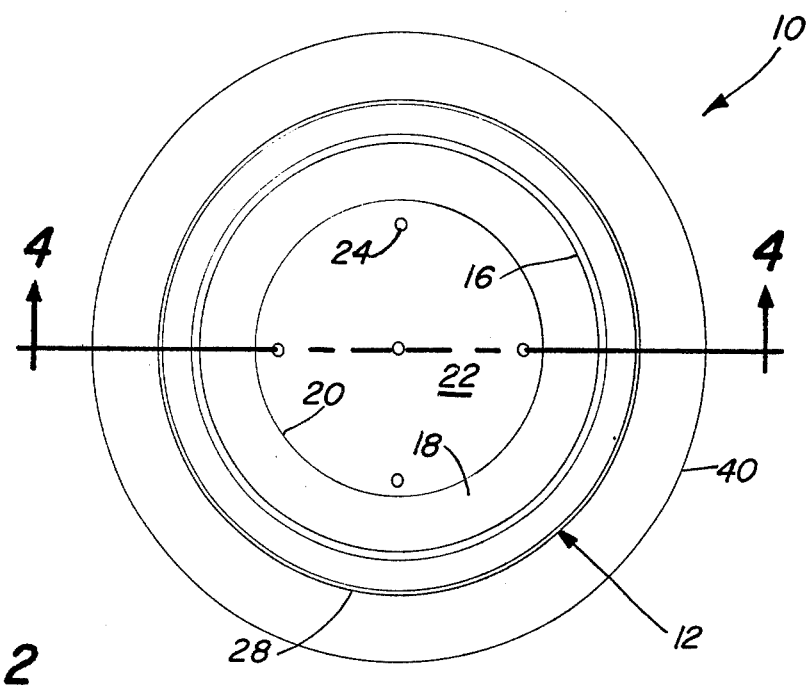
FIG. 2 is a top plan view of the one-cup coffee maker illustrated in FIG. 1.

As can best be seen in FIG. 4 of the drawings, the four apertures 24 formed in the bottom wall 22 of the reservoir 12 are of a circular shape disposed near the side walls of the circular section 20 at 90° intervals with a fifth aperture being disposed at the center of the bottom wall 22. The apertures 24 are sized to permit a measured amount of hot water to flow from within the reservoir 12 through the apertures 24 at a predetermined rate, which is a function of the desired brewing time of the charge of coffee located in the coffee receptacle 14. Each aperture 24 has a diameter of approximately 0.07 inch.

Figure 3:
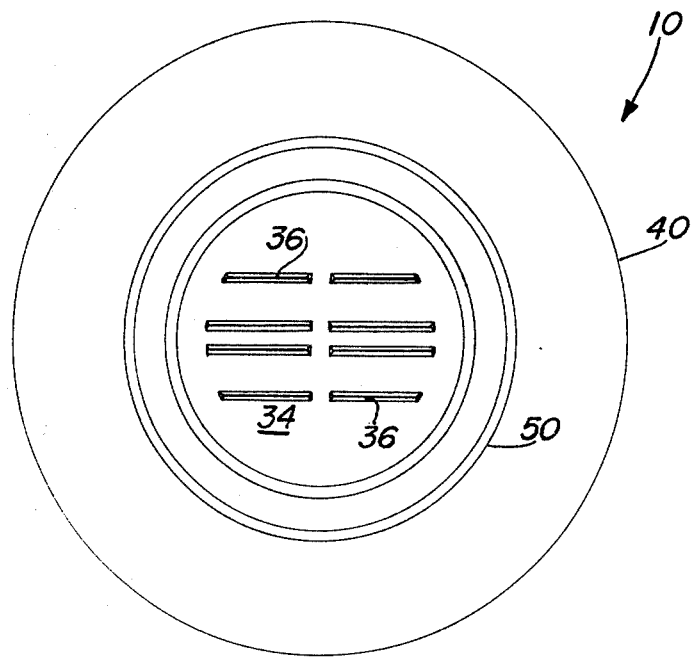
FIG. 3 is a bottom elevational view of the one-cup coffee maker illustrated in FIGS. 1 and 2 of the drawings.
Figure 6:
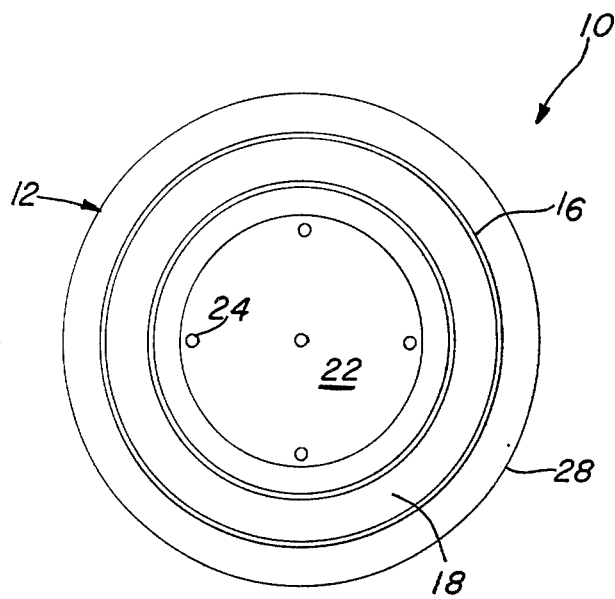
FIG. 6 is a fragmentary view of the bottom of the reservoir of the one-cup coffee maker as seen from Line 6—6 of FIG. 5.
Figure 7:
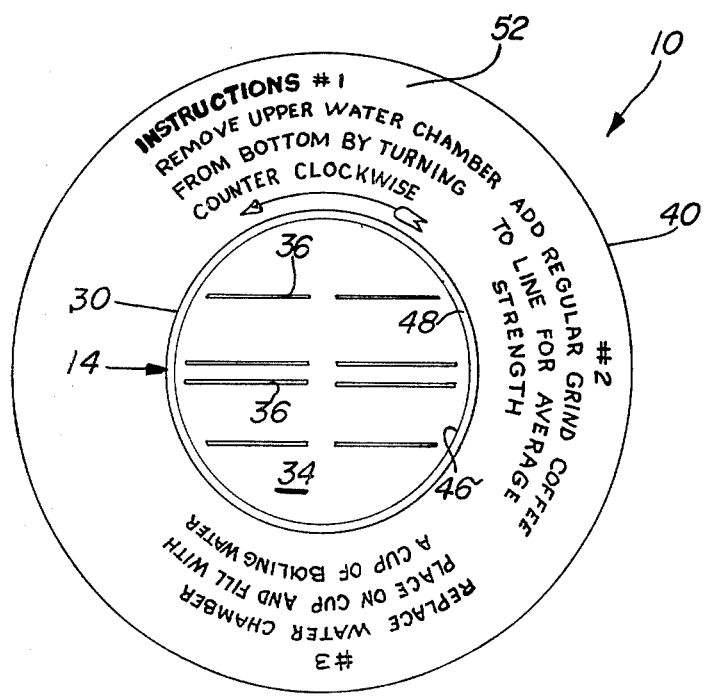
FIG. 7 is a fragmentary top plan view of the coffee receptacle of the one-cup coffee maker as seen from Line 7—7 of FIG. 5.

Referring now to FIGS. 3, 4 and 7, it can be seen that the cup-shaped receptacle 14 includes a cylindrical or circular side wall 30 and an integral bottom wall 34. The integral bottom wall 34 is provided with a plurality of transversely disposed and laterally spaced slits 36 which define apertures that communicate the interior cavity 38 with the bottom of the coffee brewer 10.

As can best be seen in FIG. 8, each slit or aperture 36 has a truncated cross-section with the smaller opening 41 communicating with the interior 38 of the receptacle 14. The openings 41 are approximately 0.65 inch in length and 0.02 inch in width. The larger openings 43 communicate with the coffee cup 15 and have a length of approximately 0.65 inch and a width of approximately 0.06 inch.

The coffee receptacle 14 has a radially extending, annularly shaped support flange 40 projecting radially outwardly from the lower end of the cup-shaped receptacle 14. The support flange 40 has a diameter that is greater than the maximum sized cup 15 (FIG. 1) on which it is desired to utilize the coffee brewer 10. As can best be seen in FIG. 1 of the drawings, the coffee brewer 10 is positioned on top of the upper edge 44 of the cup 15 such that the entire coffee brewer 10, including the charge of coffee and hot water carried by the reservoir 12, is supported by the cup 15.

Of particular importance is the interior surface 46 of the cup-shaped coffee receptacle 14. The interior surface 46 has a taper extending from its upper edge 48 toward the bottom 34. The taper is inwardly toward the bottom 34 and, thus, will interfere with the taper formed on the outer peripheral surface 26 of the lower circular section 20. It can thus be seen that when the reservoir 12 is telescopically received by the receptacle 14, the interfering tapered surfaces of the reservoir 12 and receptacle 14 will snugly and sealingly, but releasably, secure the reservoir 12 to the receptacle 14.

As can be seen in FIGS. 1, 3 and 4, the bottom 34 of the receptacle 14 is circumscribed by an annular rim 50. The rim 50 functions to limit the amount of lateral movement of the coffee brewer 10 with respect to the coffee cup 15 as the outer surface of the rim 50 abuts the inside edge of the coffee cup 15, thereby preventing the accidental removal of the coffee brewer 10 from the coffee cup 15.

In use, the reservoir 10 is removed from the coffee receptacle 14 by rotating the reservoir 10 with respect to the receptacle 14. A desired amount of ground coffee is poured into the receptacle cavity 38, and the reservoir 12 is replaced onto the receptacle 14 until it is secured to the receptacle 14 in the manner heretofore described. Hot water is then poured into the interior of the reservoir 12, whereupon the water will be metered through the slots 24 at a desired rate. Hot water will mix with the coffee in the receptacle cavity 38, leaching the same. The brewed coffee will then pass through the slits 36 at a metered rate which corresponds to or is slightly less than the rate at which water is passed from the reservoir 12 through the metered orifices 24.

After the coffee has been brewed, the coffee brewer 10 is removed from the cup 15 and may be cleaned in a very simple, convenient manner by rinsing the receptacle 14 and reservoir 12 in water.

It should be noted that in addition to the support flange 40 functioning to support the coffee brewer 10 on top of the coffee cup 15, the exposed surfaces of the flange 40 may be utilized to provide a simple means for inscribing instructions for use of the brewer 10. An example of instructions is disclosed at 52 in FIG. 7 of the drawings.

It can thus be seen that applicants have disclosed a new and improved one-cup coffee brewer which is extremely simple in its design and use and one which will provide the user with a simple and convenient means for brewing a cup of coffee.

It should be understood by those skilled in the art of one-cup coffee brewers that other forms of applicants' invention may be had, all coming within the spirit of the invention and scope of the appended claims.

What is claimed is as follows:

1. A one-cup coffee brewer consisting of a two-member construction, the first member being a cup-shaped reservoir and the second being a cup-shaped coffee receptacle, said cup-shaped reservoir having an upper circular wall and a lower circular wall of a lesser diameter than said upper circular wall, said circular walls being connected by an integral shoulder, said lower circular wall having a bottom including a plurality of apertures of a predetermined size, said apertures being disposed adjacent the lower circular walls of said reservoir at 90° intervals, and an aperture disposed at the center of said bottom wall, said lower circular wall having an inward taper extending from said shoulder toward said bottom wall to define a socket engaging surface, said reservoir being sized to hold a quantity of water sufficient to fill a cup of maximum desired size; the upper edge of said reservoir having an outwardly flared section which increases the inner diameter of the upper portion of said reservoir and which permits the user to grasp the same to permit removal of said reservoir from said receptacle, said flared end further functioning to limit the splashing of water from the interior of said reservoir during initial pouring of water therein;

said cup-shaped coffee receptacle having a circular wall defining a cavity and a bottom wall with a plurality of fine slits disposed in a transverse fashion on said bottom wall at laterally spaced, parallel locations, said slits defining apertures communicating with said cavity, the coffee receptacle cavity being sized to receive a charge of ground coffee sufficient to make one cup of brewed coffee of maximum desired strength, the inner surface of the circular wall of said receptacle having a taper adapted to snugly interfere with said reservoir tapered lower circular wall when the same is telescopically received within said receptacle cavity so as to securely and releasably attach said reservoir to said receptacle, said receptacle circular wall having an outer diameter less than the outer diameter of said reservoir upper circular wall, said receptacle having an integral, annular support flange projecting radially from the lower end of said receptacle circular wall, said support flange having a diameter greater than the maximum sized cup upon which the coffee brewer is to be supported;

the apertures in said reservoir being sized to permit a metered rate of flow from said reservoir to said cavity within said receptacle, while the apertures in said receptacle bottom are sized to permit a rate of flow from said receptacle cavity, which rate of flow is the same as the rate of flow through said reservoir apertures; and a circular rim projection integral with and extending downwardly from the lower surface of said support flange and radially outwardly from and above said reservoir bottom wall to limit the amount of lateral movement of said coffee brewer with respect to said coffee cup supporting said brewer.

* * * * *